United States Patent [19]

Roller

[11] 4,059,520
[45] Nov. 22, 1977

[54] APPARATUS FOR FILTERING AND HEATING A LIQUID

[75] Inventor: Thomas W. Roller, Webster, N.Y.

[73] Assignee: Eastman Kodak Company, Rochester, N.Y.

[21] Appl. No.: 691,690

[22] Filed: June 1, 1976

[51] Int. Cl.$^2$ .................. B01D 35/18; F24H 1/10; H05B 1/00
[52] U.S. Cl. ..................... 210/184; 210/438; 210/451; 219/201; 219/296; 219/306
[58] Field of Search .................. 219/296–299, 219/306, 307, 200, 201; 210/184–186, 437–443, 451, 453

[56] References Cited

U.S. PATENT DOCUMENTS

| | | | |
|---|---|---|---|
| 564,657 | 7/1896 | Stiebel | 219/296 UX |
| 1,075,978 | 10/1913 | Joerin et al. | 219/296 X |
| 2,886,180 | 5/1959 | Morgan et al. | 210/443 X |
| 3,232,081 | 2/1966 | Severance et al. | 210/184 X |
| 3,235,084 | 2/1966 | King et al. | 210/184 X |
| 3,502,218 | 3/1970 | Tuffnell et al. | 210/438 X |

Primary Examiner—A. Bartis
Attorney, Agent, or Firm—N. Rushefsky

[57] ABSTRACT

A longitudinally extending housing contains an element for filtering a liquid and an element for heating the liquid. The housing is internally divided into a longitudinally extending generally cylindrical outer chamber, containing the filter element, and a similarly extending cylindrical inner chamber, containing the heating element. The flow of filtered liquid from the outer chamber to the inner chamber is permitted only by having the liquid flow over a generally cylindrical wall defining a weir, which divides the housing into the two chambers. The weir cooperates with a specially formed conical configuration on an end of the housing to define a liquid flow path between the chambers in which undissolved air may be removed from the housing. After entering the inner chamber the filtered liquid flows along the length of the axially directed heating element and the heated and filtered liquid is thereafter discharged from the housing.

5 Claims, 2 Drawing Figures

APPARATUS FOR FILTERING AND HEATING A LIQUID

BACKGROUND OF THE INVENTION

1. Field of the Invention

This invention relates generally to liquid handling systems, and, more particularly, to such systems requiring both filtering and heating of a liquid.

2. Description of the Prior Art

It is known in the prior art that the efficacy of liquids used in processing systems, such as photographic processing systems, can be extended if the liquids are filtered either continuously or periodically. Also, it is often necessary to control the temperature of liquids used in such processing systems. In one type of liquid handling system known to the prior art, a processing liquid is pumped from an applicator assembly, used in a photographic processing apparatus, through a housing containing a filter to a separate housing containing a heater. The heated and filtered liquid is then returned to the applicator assembly. Difficulties encountered using systems of the aforementioned type include excessive pressure drop, possible leakage of liquid at the numerous fittings required and increased space requirements within the processing apparatus for the separate components.

SUMMARY OF THE INVENTION

The present invention provides an apparatus for overcoming the aforementioned problems encountered with use of the liquid handling systems known to the prior art. By combining the filter element and the heating element in the same housing, the possibility of leakage is reduced because of a fewer number of fittings. Less space is required within the apparatus because only one housing is needed, and there is less pressure drop as liquid passes through only one housing.

More specifically, the present invention is directed to an apparatus for filtering and heating a liquid which comprises an elongate housing that is internally divided by a partition into two similarly extending chambers, an outer chamber and an inner chamber that is substantially surrounded within the outer chamber. The outer chamber has provided therein means for admitting the liquid and means for filtering the liquid. After being filtered, the liquid flows from the outer chamber to the inner chamber over a flow path defined by the partition and an end wall of the housing. The partition cooperates with a specially formed end of the housing to define a liquid flow path between the chambers in which undissolved air may be removed from the housing. The liquid then flows along a substantial length of a heating element in the inner chamber. Finally, the filtered and heated liquid is discharged from the housing.

The invention, and its other features and advantages, will be set forth and become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Because liquid handling systems are well known, the present description will be directed in particular to elements forming part of, or cooperating more directly with, apparatus in accordance with the present invention. It will be understood that elements not specifically shown or described may take various forms well known to those skilled in the art.

Figure 1:
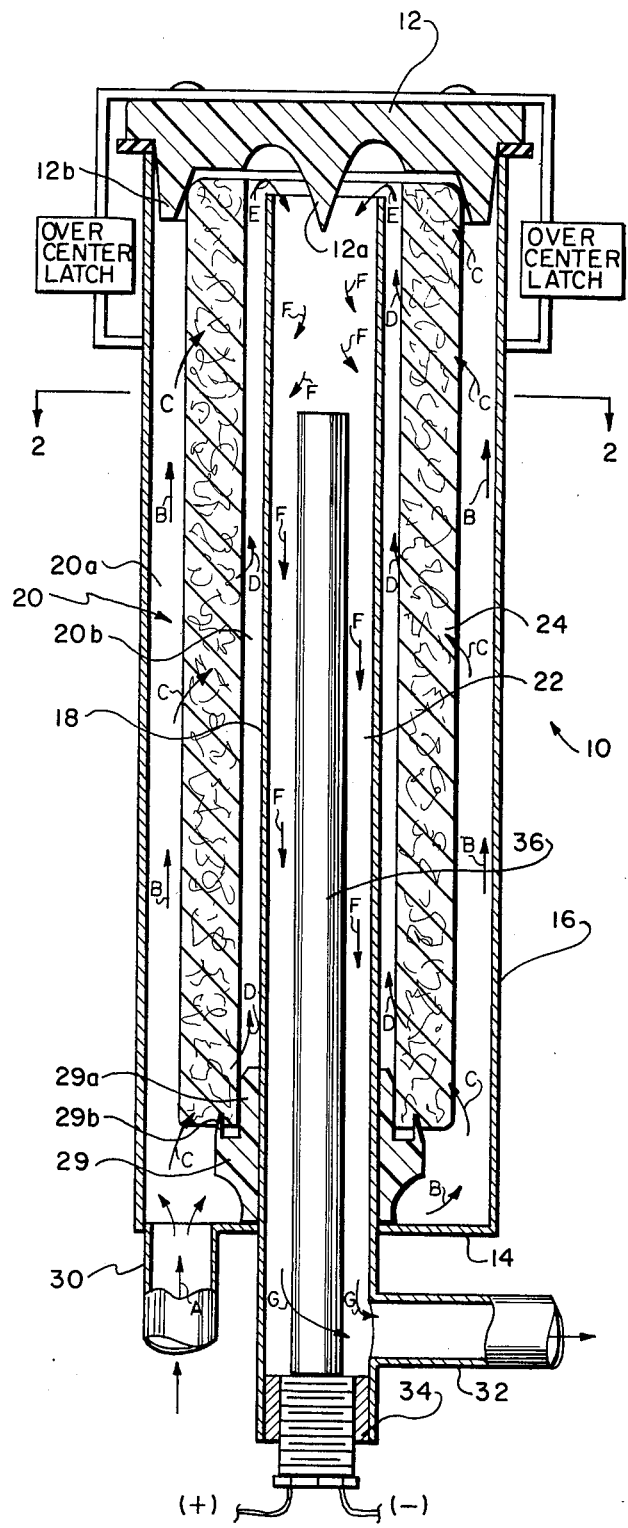
FIG. 1 is a longitudinal cross-sectional view of apparatus depicting one embodiment of the invention.
Figure 2:
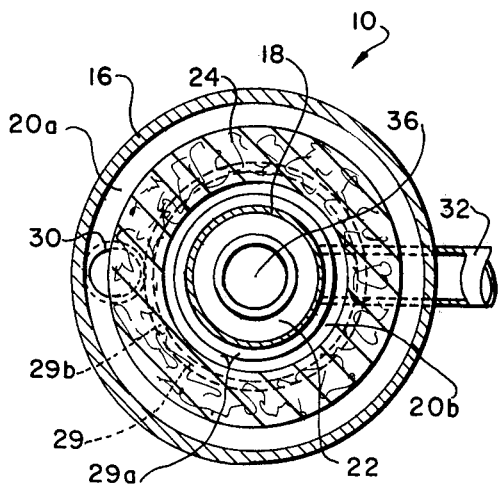
FIG. 2 is a cross-sectional view taken along line 2—2 of the apparatus of FIG. 1.

Referring now to FIG. 1, a cylindrical housing, generally designated 10, is shown having end walls 12 and 14 and vertically extending cylindrical sidewall 16. End wall 12 may be removably affixed to the sidewall 16 by a suitable conventional over-center latching mechanism. Housing 10 is internally divided by an imperforate cylindrical partition or weir 18 into a longitudinally extending outer chamber 20 and a similarly extending inner chamber 22, the latter chamber being substantially surrounded by the outer chamber. End wall 12 comprises a molded member of, for example, a suitable plastic which cooperates with the partition 18 to define a liquid flow path for directing the counter flow of liquid from the outer chamber 20 to the inner chamber 22. It may be noted that end wall 12 at the center thereof includes a dependent portion 12a of generally conical configuration which extends downwardly below the top of the weir so that the vertex thereof is located within the inner chamber to provide a generally smooth flow path for the liquid as it flows over the weir and into the inner chamber 22. A replaceable hollow cylindrical filter element 24 of conventional construction is mounted in the outer chamber 20 and divides the chamber 20 into two parts, generally designated 20a and 20b. In the preferred embodiment end wall 12 has molded thereon an annular tapered ridge 12b which depends from end wall 12 to support and locate one end of the filter element 24. End wall 14 has associated therewith a filter holder member 29 which is inserted about the bottom portion of weir 18. Filter holder member 29 includes a cylindrical inner portion 29a which fits within the hollow end portion of the filter element 24 and an upstanding ridge portion 29b which is adapted to be pressed firmly into the bottom end of the filter element. Closure of the over center latch forces end wall 12 towards end wall 14 and the filter element is properly located and firmly supported by cooperation of filter holder member 29 and ridge 12b to provide a sufficiently liquid-tight seal so that substantially all liquid passing from outer chamber part 20a to outer chamber part 20b will pass through the filter element 24. Liquid can be furnished to the outer chamber part 20a through an inlet pipe 30 that may be connected to end wall 14. As may be noted from FIG. 1, part of the inner chamber 22 extends axially below end wall 14, and into this lower extension a liquid discharge outlet pipe 32 can be provided for removing liquid from the apparatus. Also provided within this lower extension is a threaded well 34 into which a heater, such as electric immersion heating element 36, is screwed. The heated portion of the element 36 extends axially into the inner chamber 22 of housing 10. Means are provided for furnishing electrical power to the heating element 36. Also, there may be provided means (not shown) to sense the pressure and/or temperature of the liquid to control the operation of the heating element 36.

In the operation of the preferred embodiment, liquid flows into the housing 10 through pipe 30 in the direction of arrow A. The liquid starts to fill part 20a (direction of arrows B) and passes through the filter 24 (as shown by arrows C) into part 20b, filling that part (direction of arrows D). The liquid, after substantially filling outer chamber 20, flows over weir or partition 18, through the liquid flow path defined by arrows E. The contour of the molded end wall 12 is such that any air entrapped in the liquid flow path is purged by the counter flow of liquid from outer chamber part 20b to inner chamber 22. Thus it can be appreciated that problems associated with the formation of stagnant air pockets within the housing 10 are substantially minimized. The presence of such air pockets is particularly undesirable since the trapped air could be heated to temperatures sufficient to melt the molded end wall 12. After the liquid enters the inner chamber 22 it flows in the direction of arrows F longitudinally along the heating element 36 and exits the housing 10 at pipe 32 (arrows G).

Interestingly, it has been found that other than stopping the power to heater element 36 when no liquid is being pumped into the housing, no special measures are required to prevent heat degradation of filter 24 by the substantial heat generated by heating element 36. The combination of liquid flowing in the directions of arrows D and F and the partition 18 provides sufficient insulation and protection for the filter 24. Also, since the liquid flows longitudinally along heating element 36, lower heater operating temperatures can be used to obtain the desired increase in temperature of the liquid. Furthermore, the filter element itself provides some insulation against the loss of heat which would otherwise be lost and not used for heating the liquid.

The invention has been described in detail with particular reference to a preferred embodiment thereof, but it will be understood that variations and modifications can be effected within the spirit and scope of the invention.

What is claimed is:

1. An apparatus for filtering and heating a liquid, which apparatus comprises:
   means defining an elongate housing having first and second opposed end walls;
   means within said housing including a longitudinally extending imperforate wall means to define an inner chamber and cooperating with the elongate housing to define an outer chamber which substantially surrounds the inner chamber, the longitudinally extending wall means being spaced from the first end wall of the housing to permit filtered liquid to flow between the outer and inner chambers;
   means for introducing a liquid to be filtered and heated into the outer chamber of the housing;
   longitudinally extending filter means located in the outer chamber for filtering the liquid introduced into the housing, the filter means being spaced from the longitudinally extending wall means to define a liquid flow path between the filter means and the longitudinally extending wall means for flow of the filtered liquid towards the first end wall of the housing;
   the first end wall of the housing including a dependent portion of generally conical configuration which extends into the inner chamber and has a base external of the inner chamber and a vertex within the inner chamber, said portion cooperating with the longitudinally extending imperforate wall means to reverse the direction of the liquid moving towards the first end wall of the housing and to direct the liquid to flow into the inner chamber in a direction towards the second end wall of the housing;
   longitudinally extending heating means located in the inner chamber of the housing and extending from the second end wall of the housing towards the first end wall of the housing for heating the filtered liquid as it flows along the heater means; and
   means located proximate the second end wall of the housing for removing filtered and heated liquid from the inner chamber.

2. The apparatus according to claim 1 wherein the first end wall further includes a contoured portion for defining, in cooperation with said dependent portion and said longitudinally extending imperforate wall means, a smooth, substantially continuous liquid flow path between said liquid flow path in said outer chamber and said inner chamber.

3. The apparatus according to claim 1 wherein said vertex of said dependent portion is substantially free from contact with other means within said inner chamber.

4. The apparatus according to claim 1 and wherein the elongate housing extends in a generally vertical direction and the first end wall of the housing is located vertically above the second end wall of the housing.

5. The apparatus according to claim 1 wherein the housing, the filter and the longitudinally extending imperforate wall means are each of generally cylindrical configuration.

* * * * *